C. W. SIEMENS.
Means for Regulating Electric Currents.

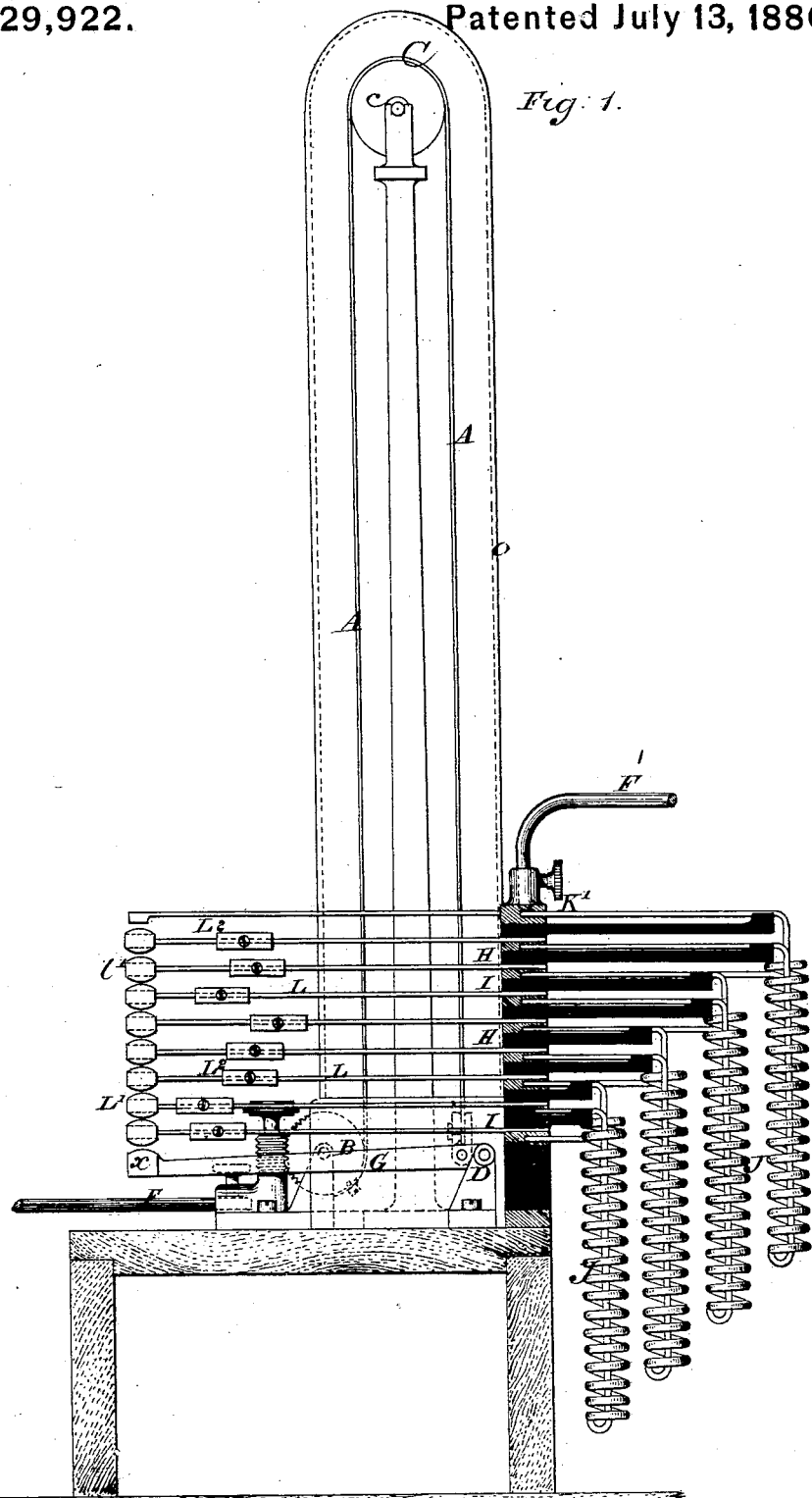

No. 229,922. Patented July 13, 1880.

Witnesses:
H. A. Daniels
Wm N Bates

Inventor:
Charles W Siemens
by Charles L Whitman
Attorney

C. W. SIEMENS.
Means for Regulating Electric Currents.

No. 229,922. Patented July 13, 1880.

Witnesses:
H. A. Daniels
Wm H Bates

Inventor:
Charles W. Siemens by
Charles S. Whitman
Attorney

UNITED STATES PATENT OFFICE.

CHARLES W. SIEMENS, OF QUEEN ANNE'S GATE, WESTMINSTER, ENGLAND.

MEANS FOR REGULATING ELECTRIC CURRENTS.

SPECIFICATION forming part of Letters Patent No. 229,922, dated July 13, 1880.

Application filed September 16, 1879. Patented in England June 7, 1878.

*To all whom it may concern:*

Be it known that I, CHARLES WILLIAM SIEMENS, of Queen Anne's Gate, Westminster, England, have invented a new or Improved Means for Regulating and Distributing Electric Currents; and I do hereby declare that the following description, taken in connection with the accompanying drawings, hereinafter referred to, forms a full and exact specification of the same, wherein I have set forth the nature and principles of my said improvement, by which my invention may be distinguished from others of a similar class, together with such parts as I claim and desire to secure by Letters Patent—that is to say:

Electrical currents are frequently subject to fluctuation, arising from variations in the power producing them, or in the number or condition of the lamps or other instruments to which they are applied, or from other causes, and such variations are of serious disadvantage, particularly in cases where the electricity is applied for producing illumination, causing, as they do, fluctuation and frequently extinction of the light.

When a number of electrical lamps are arranged to receive their supply of electricity from one source it is a matter of extreme difficulty to determine the share of the general current that each should receive and to maintain regularity in its supply, and when there is cessation of the action of one or more of such lamps the action of the others is seriously interfered with or entirely arrested.

My invention relates to means of obviating these difficulties by the use of apparatus which automatically determines the amount of current delivered to each lamp and renders it practically constant and uniform, notwithstanding considerable variations in the generating power or in the demand made upon it.

I will describe the means which I employ for this purpose.

Figure 2:
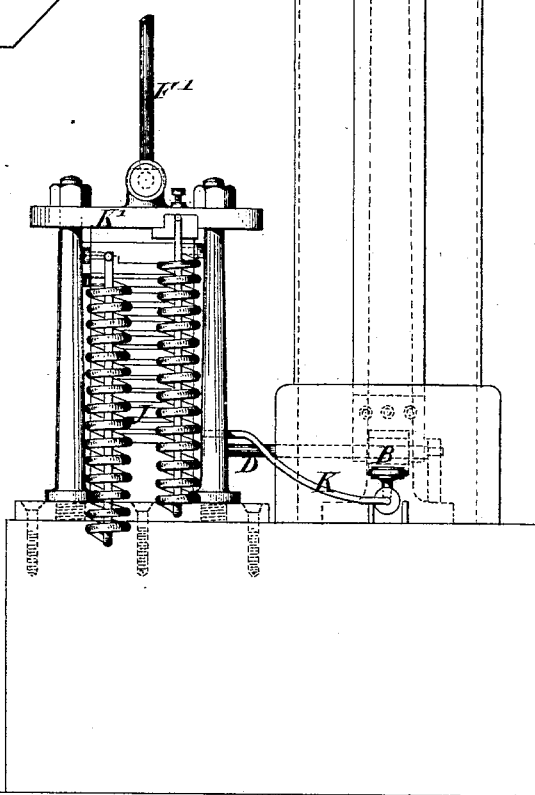
Figure 3:
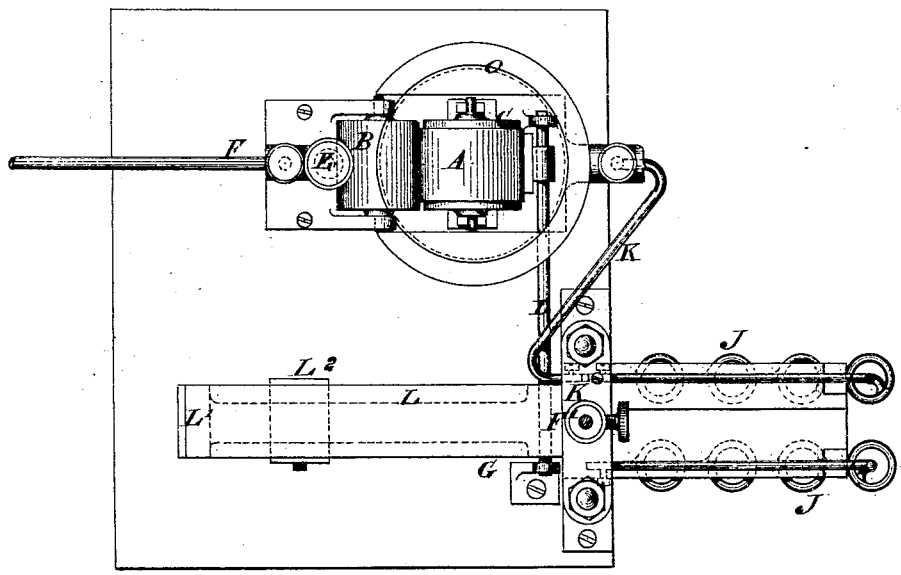

Referring to the accompanying drawings, Figure 1 represents a side view, Fig. 2 an end view, and Fig. 3 a plan, of my apparatus for automatically regulating the supply of electricity to a lamp or other instrument to which it may be applied, this apparatus being for that purpose placed within the circuit by connecting its terminals to the conductor leading to or from the lamp or instrument that is to be regulated by it.

In this apparatus, A is a strip or ribbon of metal, such as silvered copper or iron, made exceedingly thin, so that it may rapidly give off such heat as may be imparted to it. This strip is at one end secured to a toothed metallic roller, B, and is passed over a plain roller, C, of ebonite or other suitable insulating material, and down to an arm on a spindle, D, to which arm it is secured. The teeth of the roller B gear with a tangent-screw, E, which is connected to the circuit-wire F, and which being turned causes rotation of the roller B.

On the spindle D is fixed a lever, G, the weight of which puts a certain tension on the strip A, and which, by any contraction of the strip, is caused to rise, while expansion of the strip allows it to descend more or less.

A number of metal plates, H H, by preference of platinum or platinized or gilt copper, are arranged in a column, one above the other, with intervening plates, I, of insulating material, such as ebonite, and have their alternate ends connected to each other through resistance-coils J, of low conductivity, so that the lowest plate being electrically connected to the strip A by a wire, K, and the topmost plate being electrically connected through the last resistance-coil and insulated framing K' to the circuit-wire F', a current passed from F through the metal strip A would have to pass in a zigzag direction consecutively through all the plates H and resistance-coils, from the lowest to the highest, before passing onward through the circuit-wire F'. To each plate H is fixed a spring, L, of suitable conducting metal, terminating in a contact-piece, L', so arranged that when not acted upon by the lever G these contact-pieces do not touch each other, as shown in the drawings, so that under this condition the current has to pass through all the resistance-coils, as above described. When, however, the lever G is raised somewhat, so as to bring the lowest contact-piece, L', in contact with the second one, the current will mostly pass from the former through the latter to the second of the bars H without having all to pass through the resistance-coil connecting them, and thus the resistance to the passage of the current will be reduced.

If by the further raising of the lever G the second of the pieces L' be brought in contact with the third one, the second resistance-coil will be cut out of the circuit, and so on until all the contact-pieces are pressed together, so as to cut the whole of the resistance-coils out of the circuit, the current then almost entirely passing direct through all the contact-pieces to the top spring, L, and thence to the circuit-wire F'.

From this arrangement it will be seen that if the metal strip A be so adjusted by the screw E that when the desired quantity of electric current is passing through the apparatus the strip, being expanded to a certain extent by the heat resulting from its resistance, will hold the lever G in such a position as to bring a certain number of the pieces L' in contact, then, on an increase of electric current passing through the strip, the increased heating and expansion thereof will cause the lever G to drop somewhat, and in thus bringing one or more additional resistance-coils into circuit the electric current passing through the apparatus will be again diminished. The strip A, in again cooling and contracting in length in consequence thereof, will raise the lever G to the normal position. If, on the other hand, the strength of the current decreases below the normal amount, the metal strip in cooling will raise the lever, so as to still further reduce the resistance, as above described, and thereby allow the passage of an increased quantity of the current. The contact-springs L are provided with adjustable weights $L^2$, by shifting which the distances between the contact-pieces L' may be accurately adjusted.

By making the metal strip A exceedingly thin, so that it parts very rapidly with its heat, and by so arranging its connection to the spindle D that the motion resulting from its expansion and contraction is considerably multiplied by the lever G, very slight changes in the strength of the current affect the apparatus so as to produce an almost instantaneous regulation.

This apparatus may also be made available for recording the variations of the strength of the current during certain intervals of time by providing the lever G at $x$ with a pencil or style brought in contact with a horizontal traveling band of paper, caused by any suitable clock-work mechanism to travel past the style equal distances in equal intervals of time, and marked with corresponding transverse divisions denoting such intervals of time, so that the fluctuating line drawn by the style on the strip as the lever G rises or falls during the passage of the strip, by comparison with a straight line marked by an adjustable stationary style representing a certain normal strength of current, will indicate the variations in the strength of the current passing through the apparatus during such intervals of time, and thus the apparatus may be made to serve as a meter of the quantity of electric current used.

The metal strip A is, by preference, inclosed in a glass or other casing, O, in order to preserve it from atmospheric currents and to make the radiation from its surface a quantity depending only upon its own temperature, while the external temperature remains practically constant.

Figure 4:
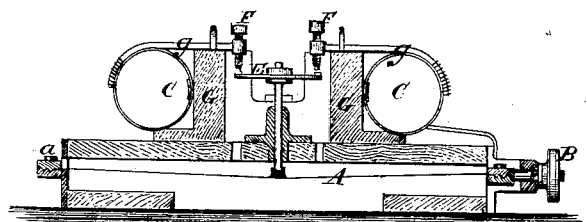
Figure 5:
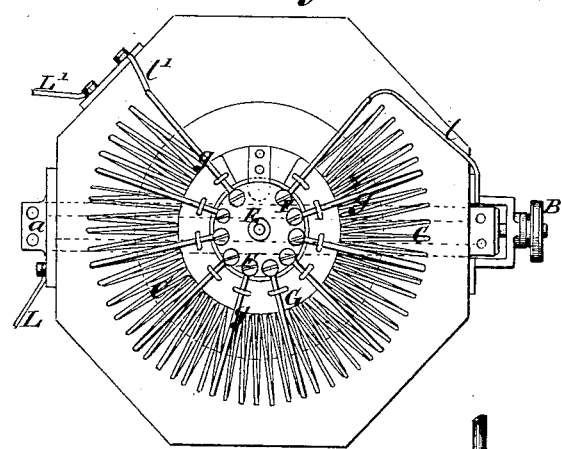

Fig. 4 is a section, and Fig. 5 a plan, of a modified form of apparatus according to my invention for automatically regulating an electrical current. In this arrangement the resistance-coils and their connections are arranged radially round a center, so as to form a compact and portable apparatus. In this case the strip of metal A is stretched horizontally between a clamp, $a$, at one end and a regulating-screw, B, at the other end. The current, entering by the wire L, passes through the strip, and thence, by a wire, $l$, to the first of the series of radiating-coils C, of German silver, after passing through all of which it passes by a wire, $l'$, to the wire L'. On the middle of the strip A rests a saddle of insulating material, such as ebonite, attached to the stem of a metallic disk, E, having a number of platinum contacts arranged on its upper surface. Over each of these contacts is an adjustable contact-screw, F, passing through the eye of a wire, $g$, which rests on the circular framing G, made of wood or other insulating material, and is connected to one of the coils C. Each of the wires $g$ is free to be lifted off the frame G when the disk E bears against the point of the screw F, and these screws are so adjusted to different depths that when the disk E is in its lowest position none of them touch it; but as the disk E rises, one after another of the screws F touches the contacts on the disk until, when the disk E is in the highest position, all the screws F are in contact with it.

In setting the regulator to work the strip A is tightened by the screw B to such an extent as to raise the disk E to contact with all the screws F, and if things remained in that condition an electrical current passed through the apparatus would be short-circuited from $l$ to $l'$ with little resistance; but such current, in passing through the strip A, will heat it and cause it to expand in length, whereby the disk E, resting on it, will be lowered, so as to break contact with one, two, three, or more of the screws F, thus causing the current from $l$ to pass through one, two, three, or more of the sets of coils C with a proportional resistance to its passage.

Having thus described the nature of my said invention and the best way I know of carrying it into practical effect, I claim—

1. The method of effecting the regulation and distribution of electrical currents by passing them through a stretched metal strip the variations in the thermal expansion of which, consequent on variations in the electric currents, cause separate resistances to be successively introduced into or eliminated from the circuit.

2. The combination of the thin metal strip

A, forming part of the electrical circuit, with the lever G, a number of contact-pieces, L′, with their springs L, and resistance-coils J, substantially as and for the purpose herein set forth.

3. The combination of the strip A with the toothed roller B and tangent-screw E, or their equivalent, whereby the position of the lever G is adjusted.

4. The combination of the sliding weights $L^2$ with the springs L and contact-pieces L′, whereby the distances of the latter are adjusted.

5. The combination of a number of movable pieces, L′, each electrically connected with the next in order through a resistance, and all so arranged that two, three, or more can be successively brought into contact, so as to form direct passage for electricity from the one to the other.

In testimony whereof I have signed my name to this specification, in the presence of two subscribing witnesses, this 8th day of August, 1879.

C. WILLIAM SIEMENS.

Witnesses:
   J. D. LACY,
*Clerk to Ridgway & Sons, 2 Waterloo Place, Pall Mall, S. W.*
   CHARLES E. P. WILSON,
*Notary's Clerk, 2 Waterloo Place, Pall Mall, London, S. W.*